United States Patent Office 3,428,712
Patented Feb. 18, 1969

3,428,712
PROCESS FOR OBTAINING POLYBUTADIENE-MODIFIED STYRENE RESINS
Frederick E. Carrock, Wyckoff, Barna Toekes, Oakland, and Kenneth W. Doak, Woodcliff Lake, N.J., assignors to Rexall Drug and Chemical Company, Los Angeles, Calif., a corporation of Delaware
No Drawing. Filed Aug. 22, 1963, Ser. No. 303,940
U.S. Cl. 260—880                       8 Claims
Int. Cl. C08f $33/02, 45/28, 45/70$

ABSTRACT OF THE DISCLOSURE

An improvement is described in the process of preparing rubber-modified polystyrenes by prepolymerizing a mixture containing styrene, a polybutadiene rubber and a chain regulator such as an alkyl mercaptan until a monomer conversion of 10 to 45% is achieved, dispersing the partially polymerized reaction mixture in an aqueous suspension and completing polymerization. The improvement involves adding additional chain regulator in at least one separate increment during the polymerization process in order to obtain a rubber-modified polymer having higher impact strength and hardness in comparison to products prepared employing a single addition of regulator having the same melt index.

---

This invention relates to an improved process for preparing rubber-modified plastic resins, and more particularly to an improved polymerization process for preparing rubber-modified polymers and interpolymers to obtain polymeric products having outstanding impact and melt flow properties as well as other desirable chemical and physical properties. The invention also pertains to the copolymerization of a vinyl aromatic compound, either alone or in admixture with another monomeric compound, with a rubbery material to obtain a so-called gum plastic product.

Two of the most widely known gum plastics are rubber-modified polystyrene and ABS polymers, the latter being prepared from styrene, acrylonitrile and a rubbery material such as a polybutadiene rubber. These polymers have found numerous commercial applications because of their unusual combination of chemical and physical properties. High impact rubber-modified polymers or rubber-resin materials are often difficult to injection mold in that they do not flow readily enough to fill intricate molds under conditions which are required for economic commercial manufacture. It will be understood that in injection molding, the plastic material is required to become sufficiently flowable, under the influence of the heat and applied injection pressure, to flow readily through the relatively small opening or gate in the injection mold, and the material must be sufficiently fluid to fill out the entire mold cavity, which frequently consists of an intricate pattern including many relatively restricted areas. The material must knit together in the mold cavity into a strong, unitary, properly shaped body that is free from voids or any sort of discontinuities, and that reproduces faithfully the exact shape and surface characteristics of the mold cavity, even in the most remote and restricted parts thereof. In these particular polymers, such easy flow characteristics have apparently been essentially incompatible with great toughness, rigidity and high impact strength, and, in general, those known materials which did lend themselves to efficient and successful injection molding operations were not as tough and/or rigid and as impact resistant as would be desired for many applications.

One object of the present invention is to provide an improved polymerization process for preparing rubber-modified polymeric products which have both superior melt flow and high impact properties.

A further object of the present invention is to provide highly desirable rubber-modified polystyrene and ABS polymers, which are capable of being readily employed in a variety of commercial processing and fabricating techniques such as injection molding and others which require high melt flow and high impact strength properties.

These and other objects of the invention will become apparent from the ensuing description and the illustrative embodiments.

In accordance with the present invention, it has now been found that rubber-modified polymers, such as polystyrene and ABS polymers, with excellent melt flow and high impact characteristics can be achieved by incremental addition of a polymerization modifier or polymer chain regulator during the polymerization. The most common types of modifiers or chain regulators known to the art are various aliphatic or aromatic mercaptans. An illustrative list of such mercaptans will be set forth below. In addition to mercaptans, this invention can employ other chain regulators, for example, carbon tetrachloride, fluorene, organic disulfide, cumene, etc. The mercaptans, however, are preferred and reference will be made to these in this specification.

It will be understood that polymerization modifiers or chain regulators, and especially mercaptans, have been previously employed in the basic and improved polymerization processes proposed in the prior art to prepare rubber-modified polymers. The chain regulator controls the length of the homopolymer (polystyrene) and graft polymer chains. Consequently, the use of the chain regulator is known to enhance the melt flow of the resulting polymeric product.

In attempting to improve the melt flow characteristics of rubber-modified polymers such as polystyrene and ABS, or other interpolymers, a number of serious problems were encountered. Although the usual amounts of modifier, i.e. mercaptan, effected sufficient improvement in the melt flow so as to permit the polymeric product to be used in commercial applications requiring a relatively high degree of flow, this was always accompanied by an attendant loss in toughness and impact strength. The surface hardness of items molded from such polymeric products was often lower than where less mercaptan is employed. It is quite obvious, therefore, that the mere use of larger amounts of mercaptan was not the answer to the goal of increasing melt flow without lowering other important physical properties below commercially acceptable values.

The present invention is based on the discovery that the desired results can be readily achieved, while avoiding or minimizing the aforementioned difficulties, by use of incremental addition of the chain regulator at various times and stages of the polymerization process. As noted above, various aliphatic or aromatic mercaptans can be effectively employed in the process of this invention. Examples of mercaptans include tertiary dodecyl, lauryl mercaptan, nonyl mercaptan, decyl mercaptan and other alkyl mercaptans having from 6 to 24 carbon atoms per molecule or a mixture of these or higher molecular weight mercaptans. Similarly, aryl mercaptans are also useful as chain regulators in the present invention, and illustrative examples of such mercaptans include triophenol, thionaphthol and derivatives thereof, etc. Alkyl mercaptans having 10 or more carbon atoms per molecule are preferred. The mercaptans are generally used in amounts ranging from about 0.01 to 0.5% by weight, based on the weight of the total reaction mixture. It is preferred, however, to use about 0.02 to 0.2% by weight for impact polystyrene and about 0.05 to 0.3% by weight for ABS.

In accordance with another important and distinguishing feature of this invention, the rubber component of the polymeric product is a polybutadiene rubber prepared by emulsion or solution polymerization and the like, but more specifically one prepared with stereospecific catalysts to result in a rubber having a cis (polymerized by 1,4 addition) content of about 30 to 98%, preferably 35 to 60%. Butadiene (or isoprene) polymerized by cis-1,4 addition exists in a rubbery form at ambient temperatures. The cis-1,4 form can be produced either by lithium metal or lithium alkyls or by a Ziegler-type catalyst system, as is well known in the art. These methods of polymerization yield linear polymers in contrast to the largely non-linear polymers obtained by well known emulsion polymerization recipes. The preferred cis-polybutadiene which can be employed in the process of this invention will have a viscosity between about 20 to 100, preferably 30 to 60, as measured on the Mooney viscometer at 212° F. (ML-4) (ASTM D-927-55-T).

As will be further shown in the specific embodiments illustrating the practice of this invention, the use of a non-polybutadiene rubbery component, e.g., a styrene butadiene rubber (SBR) in conjunction with the incremental mercaptan addition did not lead to the desired improvement of the melt flow characteristics without deleteriously affecting other physical properties such as impact strength. It will be understood, therefore, that the essential features of the present invention are (1) the incremental addition of the modifier and (2) the use of a polybutadiene preferably one having a cis-1,4 content of at least 30%.

While this invention includes the use, in general, of polybutadiene rubbers whether linear or non-linear, reference will hereinafter be made to linear polybutadiene (polymerized generally with stereospecific catalysts to a linear structure) and specifically to those having a cis-1,4 configuration as stated above. While it is not known with certainty why incremental mercaptan addition can be successfully practiced with polybutadiene rubbers (to obtain the polymers heretofore alluded to) but not with conventional rubbers such as the styrene-butadiene (SBR) types, it is believed that polybutadiene contains more grafting sites which somehow permit this technique of incremental mercaptan addition to be successfully practiced. It is believed that graft copolymerization is more pronounced in the later stages of polymerization. Consequently, a late mercaptan addition will reduce the length of the graft copolymer chains which in turn affect the compatibility of the rubber and resin phases. Thus, the use of two incremental additions of mercaptan to a graft polymerization mixture involving SBR, one such addition occurring just prior to completion of the prepolymerization step (see below) results in a polymer having poor impact properties. On the other hand, when a polybutadiene rubber is used with this technique, the desired impact properties can be maintained. Polybutadiene rubbers, therefore, are specifically adaptable to the process herein described so long as they are preponderantly of this structure, that is, composed of at least 95 percent polybutadiene.

In addition to the foregoing, it was experimentally shown that the overall amount of mercaptan required to give a specified melt index was lower when the incremental addition technique was used in comparison to a single addition (as in the prior art). It was also found that the surface hardness of the finished resin decreases with increasing total quantity of added mercaptan. Therefore, the incremental mercaptan addition also resulted in a finished product having improved surface hardness properties.

Although the exact number of incremental mercaptan additions during the polymerization process can vary depending upon the results sought, at least two separate and distinct mercaptan additions should be employed. In general, the number of incremental additions can vary from about 2 to 4. The exact times and points in the polymerization process for the mercaptan addition can also vary depending, in a large measure, upon the particular polymerization process involved. In other words, once the concept of incremental mercaptan addition has been established, the exact points of mercaptan addition can be varied in order to obtain maximum utilization of the mercaptan and the greatest improvement in melt flow values and still maintain high impact strength.

It is possible to employ one of the numerous prior art processes for preparing the outstanding polymeric products of this invention. However, it has been found especially advantageous to employ procedures wherein an initial prepolymerization step is carried out under prescribed conditions to obtain a conversion of from about 15 to 45%. The resulting reaction product mixture is then subjected to a second polymerization step wherein the conversion is essentially completed in the absence of shear or agitation. The second polymerization step can be carried out either in the mass, solution or the suspension polymerization methods, which have heretofore been proposed for the manufacture of rubber-modified polymers. Although the overall polymerization processes capable of being utilized in practicing the present invention will be described below in greater detail and with specific reference to the illustrative embodiments, it will be understood that the combined use of incremental mercaptan addition and linear polybutadiene has a wider application. In reference to one of the so-called two-step polymerization processes, however, it was found effective to add portions of the mercaptan separately at least twice in the prepolymerization step. A portion of the mercaptan can be first added when the rubber component is dissolved in styrene or styrenemonomer admixture, e.g. styrene-acrylonitrile, or during the early stages of prepolymerization. A second portion of mercaptan is then added at a later stage of the prepolymerization such as when conversion has reached about 10 to 45%. It will be understood, however, that the present invention encompasses at least two incremental mercaptan additions, and that in some instances, it has been found to be beneficial to add some mercaptan near the end of the prepolymerization step or after the prepolymerization step such as in the early stages of the second (non-shear) step to impart the desirable melt flow behavior and to maintain high impact strength.

Although it has been found quite effective to use substantially equivalent amounts of mercaptan in each of the incremental additions, the amounts can vary provided, of course, that the total amount of mercaptan employed does not exceed the limits described above.

The invention will now be fully understood by reference to the bulk suspension process which comprises adding the linear polybutadiene, having a cis-1,4 content of about 35 to 60%, to styrene in a prepolymerization vessel equipped with a stirrer. The linear polybutadiene rubber is preferably finely ground and is used in an amount ranging from about 4 to 15% by weight based on the total weight of the styrene. To the resulting solution of styrene and linear polybutadiene there can also be added antioxidants, lubricants and inert fillers. If desired, as an antioxidant, the conventional phenolic types such as 2,6-ditertiary-butyl-4-methyl-phenol, as well as alkyl aryl phosphites, for example, trisnonylphenyl phosphite can be used in amounts of from about 0.01 to 1.0% by weight. Mercaptans such as tertiary dodecyl mercaptan, can be added in amounts of from 0.01 to 0.15% by weight at this point in the process. Lubricants which can be incorporated in the solution are such as refined mineral oils, paraffin wax or mixtures with mineral oils and hydrocarbon oil or ester lubricants, such as butyl stearate in amounts of from 0.5 to 4% by weight. A preferred mineral oil is one of a saturated aliphatic nature boiling at from 250° to 500° C. and of a centistoke viscosity of from 5 to 100 at 100° F.

After the dissolution of the linear polybutadiene in styrene, polymerization in bulk is commenced using a peroxide catalyst of the oil-soluble type or thermally, and polymerization is continued at a temperature as follows: for thermal initiation, the temperature can range from 100° to 130° C., preferably 110° to 125° C.; for peroxide initiation, the temperature can range from 60° to 110° C., preferably from 75° to 100° C. The polymerization is continued until from 15 to 35 percent, in the preferred embodiment, of the monomers are polymerized in the mixture. The prepolymerization step generally takes from about 2 to 4 hours. A peroxide initiator, such as benzoyl peroxide, lauroyl peroxide, tertiary butyl perbenzoate, ditertiary butyl peroxide, cyclohexanone peroxide, etc., is used in amounts of from 0.05 to 0.2%, preferably 0.075 to 0.15% by weight based on the mixture.

During the prepolymerization, the components of the system are thoroughly agitated. Agitation is required to properly disperse rubber as it comes out of solution during the prepolymerization step. In accordance with the present invention, an additional amount of mercaptan, about 0.01 to 0.15% by weight, is added after prepolymerization has commenced or after the percent conversion has reached from 10 to 45%.

Upon completion of the prepolymerization step to the desired conversion, the mixture is suspended in an aqueous system containing stabilizers and polymerization continued to form beads of high impact material. An additional initiator is added to the suspension to substantially complete the polymerization. It is preferable to add a single initiator to the prepolymerization step, followed by the addition of a second initiator to the suspension polymerization step. It is possible, however, to include initially two initiators in the prepolymerization step, such as a low temperature one for prepolymerization and a high temperature one for the subsequent suspension step. A suitable initiator which can be used during the suspension polymerization is an organic peroxide such as benzoyl peroxide, caproyl peroxide, lauroyl peroxide, tertiary butyl perbenzoate, tertiary butyl peroxide, cyclohexanone peroxide, and mixtures thereof. A suspension polymerization initiator is usually desired to shorten the overall polymerization time-temperature cycle. However, the suspension polymerization step can also be carried out with thermal initiation.

The amount of suspension step initiator used is based on the weight of the prepolymer and the levels used are from about 0.05 to 0.3% by weight when a particular peroxide is used alone, or from 0.1 to 0.4% by weight when a combination of each is employed for both polymerization steps. Preferred levels are about 0.1 to 0.2% by weight for a single initiator and 0.05 to 0.15% by weight for each of a combination. An additional increment of chain regulator can be added along with the suspension step initiator or at a later stage.

The prepolymer, before or after the addition of the suspension step initiator, is suspended in an aqueous solution containing a suspending agent, and polymerization is continued at time-temperature cycles to be set forth hereinbelow until the monomer is substantially completely polymerized into uniform sized granules or beads. Suspending agents such as carboxymethyl-cellulose, polyvinyl alcohol, methylcellulose, sulfonated polystyrene, polyglycol ethers, etc., can be used.

An excellent suspending agent has recently been found to be a water-soluble non-ionic colloid of high viscosity in an aqueous solution. Hydroxyethyl cellulose is of particular interest since it yields optimum polymerization results. Hydroxyethyl cellulose of a viscosity in a 1% aqueous solution at 25° C. of from 750 to 10,000 cps. (Brookfield viscometer) is adequate. A preferred viscosity range, however, for a 1% aqueous solution of hydroxyethyl cellulose is from 1500 to 3500 cps. (Brookfield viscometer) at 25° C.

In preparing the aqueous suspension, the hydroxyethyl cellulose is sifted into the water slowly and with rapid stirring to avoid the formation of agglomerates. If desired, a surface active agent such as sodium dodecylbenzene sulfonate can also be included in the suspension water in an amount of from 0.001 to 0.01% by weight based on the water.

The amount of hydroxyethyl cellulose used is from about 0.025 to 1.5 weight percent and preferably in an amount of from 0.075 to 0.35% by weight based on the water. Any dissolved oxygen or oxygen in the atmosphere immediately above the suspension is displaced by the use of nitrogen.

The prepolymer is added to the suspension, preferably in the vicinity of the agitator blade or vanes so as to facilitate the formation and dispersion of polymer beads. The prepolymer is added in an amount such that the ratio of prepolymer to water is generally from about 1:2 to 5:4, with best results being obtained with a prepolymer to water ratio of 1:1 to 3:4.

The time-temperature cycle best suited for completion of the present polymerization process after transferring the bulk prepolymer to the aqueous system is generally from 60° to 145° C. for a period of about 4 to 10 hours. Excellent results are obtained when the suspension is maintained at a temperature of from 100° to 115° C. for 2 to 4 hours, then 115° to 125° C. for 1 to 2 hours and finally from 125° to 145° C. for 1 to 2 hours.

The following examples further illustrate the invention. The procedure employed in each of the examples was as follows:

Finely ground linear polybutadiene was dissolved in styrene. The resulting solution was added to a vessel equipped with a condenser and stirrer and while the solution was being agitated, initiator was added (when used) thereto and additives, such as chain transfer agents, antioxidants and lubricants. The agitated solution was next heated to the desired prepolymerization temperature and prepolymerization completed, under continuous agitation.

An aqueous suspension bath was prepared by dissolving hydroxyethyl cellulose having a viscosity in a 1% aqueous solution at 25° C. from about 1500 to 2500 cps. (Brookfield viscometer) in a glass bowl pressure reactor equipped with stirrer.

A peroxide initiator was mixed with the prepolymer and this, in turn, was added to the aqueous suspension bath at a moderate rate while the bath was maintained under constant agitation. The reactor and its contents were flushed with nitrogen and the reactor was sealed and pressurized with 5 to 20 p.s.i. nitrogen. Polymerization was continued with agitation using a temperature cycle of 3 hours at 115° C., 1 hour at 125° C. and 1 hour at 135° C. Upon completion of the polymerization, the mixture was cooled, the reactor opened and the contents filtered to isolate the beads. The beads were washed with water and dried in a vacuum oven at 65° C. Physical properties were measured on injection-molded specimens.

In the following examples, as set forth in Tables I and II, the weight of the linear polybutadiene, mineral oil, trisnonylphenyl phosphite, t-dodecyl mercaptan and initiator was based upon 100 parts by weight of the mixture; the weight of the high temperature initiator and additional mercaptan was based upon 100 parts by weight of the prepolymer; and the weight of hydroxyethyl cellulose in the aqueous suspension bath was based upon the weight of the prepolymer.

TABLE I

| | A | B | C | D | E | F | G | H | I |
|---|---|---|---|---|---|---|---|---|---|
| Prepolymerization Step: | | | | | | | | | |
| Styrene, percent | 91.4 | 91.4 | 93.3 | 91.4 | 91.4 | 91.2 | 91.2 | 91.4 | 91.3 |
| Rubber, percent[1] | 6.0 | 6.0 | 6.0 | 6.0 | 6.0 | 6.0 | 6.0 | 6.0 | 6.0 |
| Mineral Oil, percent | 2.0 | 2.0 | | 2.0 | 2.0 | 2.0 | 2.0 | 2.0 | 2.0 |
| Trisnonylphenyl Phosphite | 0.5 | 0.5 | 0.5 | 0.5 | 0.5 | 0.5 | 0.5 | 0.5 | 0.5 |
| Benzoyl Peroxide, percent | | | | | | | | 0.10 | |
| Cyclohexanone Peroxide, percent | | | | | | | | | 0.10 |
| t-Dodecyl Mercaptan, percent[2] | 0.02 | 0.02 | 0.05 | 0.05 | 0.10 | 0.10 | 0.10 | 0.02 | 0.10 |
| t-Dodecyl Mercaptan, percent[3] | 0.04 | 0.08 | | 0.05 | | 0.10 | 0.15 | 0.08 | 0.10 |
| Total Solids, percent | 25 | 25 | 25 | 26 | 27 | 27 | 28 | 27 | 26 |
| Polymerization Temperature, °C | 120 | 120 | 120 | 120 | 120 | 120 | 120 | 90 | 100 |
| Suspension Step: | | | | | | | | | |
| Prepolymer | 100 | 100 | 100 | 100 | 100 | 100 | 100 | 100 | 100 |
| Water | 133 | 133 | 133 | 133 | 133 | 133 | 133 | 133 | 133 |
| Hydroxyethyl Cellulose | 0.10 | 0.10 | 0.10 | 0.10 | 10.0 | 0.10 | 0.10 | 0.10 | 0.28 |
| t-Butyl Perbenzoate | 0.20 | 0.20 | 0.20 | 0.20 | 0.20 | 0.20 | 0.20 | 0.20 | 0.20 |
| Properties: | | | | | | | | | |
| Melt Flow[4] | 0.8 | 1.7 | 1.0 | 2.0 | 2.0 | 7.9 | 10.2 | 2.6 | 5.6 |
| Izod Impact[5] | 3.2 | 2.8 | 2.8 | 2.8 | 2.0 | 1.8 | 1.8 | 1.9 | 2.2 |
| Tensile Elongation, Fail, percent | 37.7 | 33.0 | 34.4 | 26.5 | 44.6 | 45.9 | 43.2 | 30.0 | |
| Rockwell "L" Hardness | 74.5 | 75.0 | 75.0 | 67.3 | 61.3 | 57.3 | 54.5 | 70.0 | 62.0 |
| Average Bead Size, Mesh | 12.8 | 18.9 | 23.5 | 21.2 | 21.6 | 25.0 | 23.2 | 21.3 | 25.0 |

[1] Linear polybutadiene having 35% cis-1,4 content (Mooney viscosity+55).
[2] Added initially, before polymerization.
[3] Added at end of prepolymerization at total solids indicated.
[4] ASTM D-1238-57T, 190° C., grams/10 minurwa (5,000 fe_ma lo_s).
[5] ASTM D-256-56, injection molded, notched, ft.lbs./sq. in.

The above data show that use of incremental mercaptan addition and linear polybutadiene results in the formation of high impact polystyrene having excellent melt flow properties.

Furthermore, these examples demonstrate that with the proper selection of chain modifier levels for each addition, the melt flow of the product can be varied between extremely wide limits, while retaining exceptionally high impact strength, excellent tensile, hardness and heat resistance properties. Thus, this invention provides a powerful tool for obtaining desired combination of properties best suited for any particular processing and end use. For example, if an exceptionally high impact strength combined with high hardness is desired in the low to medium high melt index range (e.g. extrusion application), a relatively low concentration of modifiers should be used for the first addition and a varying amount of modifiers for the second addition depending upon the desired melt flow. This is illustrated in Examples A, B, C, D and H. If, on the other hand, high impact strength in combination with high tensile elongation is desired over a wide range of melt index, a relatively high level of modifiers should be used for the first addition, while the amount of the second addition can be selected so as to obtain the desired melt index. This is shown in Examples E, F, G and I.

Examples H and I represent peroxide initiated prepolymerization, while thermal initiation was used in the remaining experiments.

It will be understood that other vinyl aromatics can be employed in place of or as part of the styrene monomer. Such compounds have, for example, aromatic nuclei substituted with groups such as methyl, ethyl or chloro. Illustrative examples of these aromatic vinyl compounds include alpha-methylstyrene, vinyltoluene, vinylxylene, vinyl ethylbenzene, vinyl chlorobenzene and mixtures thereof.

For the preparation of terpolymers using the bulk suspension process, the styrene can be employed in admixture with another monomer such as acrylonitrile or methyl methacrylate. Alpha-methylstyrene can be used as a partial replacement for styrene in polymerizations wherein styrene is the monomer or mixtures of styrene with acrylonitrile and/or methyl methacrylate. In general, the two or more monomers will be employed in a parts by weight ratio of styrene to second monomer, e.g. styrene to acrylonitrile, of about 60/40 to 80/20. This aspect of the invention will be further illustrated by the materials, operating conditions and results set forth in Table II.

TABLE II

| | A | B | C | D | E |
|---|---|---|---|---|---|
| Prepolymerization Step: | | | | | |
| Styrene | 75 | 75 | 75 | 75 | 35 |
| Acrylonitrile | 25 | 25 | 25 | 25 | |
| Methyl Methacrylate | | | | | 65 |
| Rubber[1] | 8 | 8 | 8 | [4]8 | 6 |
| Mineral Oil | 2 | 1 | 1 | 3 | |
| Trisnonylphenyl Phosphite | 0.5 | 0.25 | 0.25 | 0.5 | 0.5 |
| Benzoyl Peroxide | | | | 0.1 | 0.1 |
| t-Dodecyl Mercaptan[6] | 0.1 | 0.1 | 0.1 | 0.2 | 0.1 |
| t-Dodecyl Mercaptan[7] | 0.5 | 0.1 | 0.15 | 0.1 | 0.1 |
| Polymerization Temp., °C | 105 | 108 | 105 | 75–100 | 90 |
| Total Solids, Percent | 28.5 | 28 | 26.5 | 22 | 32 |
| Suspension Step: | | | | | |
| Prepolymer | 100 | 100 | 100 | 100 | 100 |
| Water | 100 | 133 | 133 | 100 | 133 |
| Hydroxyethyl Cellulose | 0.25 | 0.35 | 0.30 | 0.25 | 0.32 |
| t-Butyl Perbenzoate | 0.1 | 0.15 | 0.15 | 0.2 | 0.2 |
| t-Butyl Peroxide | 0.05 | 0.05 | | | |
| Properties: | | | | | |
| Melt Flow[2] | 0.7 | 0.93 | 1.5 | 2.5 | [8]1.0 |
| Izod Impact[3] | 4.9 | 5.8 | 6.3 | [5]2.0 | [5]1.5 |
| Bead Size | [9] | [9] | [9] | [9] | [9] |
| Heat Distortion, °C | | | 93 | | |
| Rockwell Hardness: | | | | | |
| R Scale | 100 | 104 | 104 | 100 | |
| L Scale | | | | | 87 |

[1] Linear polybutadiene having 35% cis-1,4 content (Mooney viscosity=55).
[2] ASTM D-1238-57T, 230° C., grams/10 minutes (5,000 grams load).
[3] ASTM D-256-56, injection molded.
[4] Linear polybutadiene, cis-1,4 content 98%.
[5] ASTM D-256-56, compression molded.
[6] Added initially before polymerization.
[7] Added at end of prepolymerization at total solids percent indicated.
[8] ASTM D-1238-57T, 190° C., grams/10 minutes (5,000 grams load).
[9] Medium.

The above data demonstrated that the practice of this invention leads to outstanding terpolymer products such as an ABS polymer and an interpolymer prepared by utilizing methyl methacrylate. The latter has the further advantage of being a substantially transparent product.

As previously noted, the present invention can be employed in the bulk solvent polymerization process wherein an inert alkyl aromatic hydrocarbon diluent is employed in the polymerization reaction. The preferred diluents have an alkyl substituent containing two or more carbon atoms and are liquid at ambient temperatures. Illustrative diluents are ethylbenzene, diethylbenzene, methyl ethylbenzenes and xylenes. The use of ethylbenzene is especially preferred.

In general, the process comprises the following steps: The reaction ingredients, including ethylbenzene, styrene, linear polybutadiene, a portion of the mercaptan and additives are mixed in one or more vessels where dissolution of the rubbery materials is accomplished. Subsequently, the mixture is heated in an agitated vessel or several vessels and polymerization (also referred to as the "prepolymerization") is carried to a certain point by catalytic or thermal initiation. In this agitated, or first polymerization step, the linear polybutadiene is precipitated and then dispersed. In the following or second polymerization process step, the partially polymerized mixture is further polymerized, after a second portion of mercaptan is added, without vigorous agitation (also referred to as "static polymerization"). The absence of agitation in this second polymerization step does not exclude the use of energy input to cause the movement of the polymerizing mixture. In the second or non-agitated process step, polymerization is carried practically to completion.

The ethylbenzene diluent, as well as a separate portion of the mercaptan, can be introduced as stated hereinbefore initially with the styrene and rubbery component, or just after the prepolymerization step so that specific advantages can be derived from its use in the second or polymerization step where the mixture is polymerized to substantial completion.

The amount of the inert diluent to be employed ranges from 3 to 30 weight percent based on the total weight of the reaction mixture. For the most preferred conditions, not less than about 5% (preferable for low rubber content formulations, e.g., medium impact polystyrenes) and not more than about 25% (preferable for high rubber content formulations, e.g., masterbatch concentrates) is used.

In carrying out the process, a polymerizable mixture of from about 65 to 98% by weight of the vinyl aromatic component, from about 2 to 30% by weight of the linear polybutadiene as the second component, excluding the diluent, an amount of ethylbenzene which comprises from about 3 to 30% of the total weight of the polymerizable reaction mixture, and about 0.01 to 0.1% of the mercaptan are mixed together to form a solution. The polymerizable mixture can also contain up to 5% of other additives. These can include initiators, lubricants, antioxidants or other stabilizers and any other materials which may be known in the art as useful in such polymerization reactions to improve the properties of the final product. Polymerization is initiated by heating the mixture with proper agitation to from 60° to 140° C., preferably in a separate vessel or vessels (prepolymerizer(s)) from that in which the polymerization is completed to high levels. For the mixtures contemplated by the process of this invention, temperatures of at least 60° C., where peroxide initiation is used, or at least 100° C. where thermal initiation is used, should be attained in the prepolymerizer. A critical amount of polymerization takes place in this step, and preferably a conversion level of the monomer or monomers present to polymer of between about 10 to 45%. Agitation by stirring should be provided in the prepolymerizer and some type of cooling is necessary, since the polymerization is an exothermic reaction and in its absence, hot spots and runaway temperatures may develop.

The prepolymerized mixture is next passed to a second polymerizer in which the polymerization is substantially completed. In this second polymerizer, temperatures are increased stepwise or in a continuous fashion to 220° C. and they are controlled critically. It is important to carry the polymerization to as near completion as possible, preferably to about 92 and up to 100% conversions of the polymerizable materials added or present.

The foregoing steps can be carried out in batchwise fashion or continuously by appropriate arrangement of the various process steps. The initial steps of the process, that is, up to the static polymerization step, can be carried out in batchwise fashion; however, where, as indicated, the initial steps up to the static polymerization are carried out batchwise, the remaining steps, which in one embodiment of this invention include heat exchange, devolatilization and phase separation, can be carried out continuously.

In a bulk polymerization technique, the same process steps can be used as above, except that no diluent is employed.

A number of runs employing the bulk solvent polymerization process are set forth in the following table.

TABLE III

|  | A | B | C | D |
|---|---|---|---|---|
| Reactants (percent by weight): |  |  |  |  |
| Styrene | 89.5 | 88.5 | 88.4 | 88.5 |
| Rubber [1] | 8 | 8 | 8 | [4] 8 |
| Mineral Oil | 3.0 | 3.0 | 3.0 | 0 |
| Trisnonylphenyl Phosphite | 0.5 | 0.5 | 0.5 | 0.5 |
| t-Dodecyl Mercaptan: |  |  |  |  |
| Initial Addition Before Polymerization | 0.02 | 0.02 | 0.02 | 0.02 |
| Second Addition Just Prior to Transfer |  | 0.02 | 0.04 | [5] 0.03 |
| Ethylbenzene | 10 | 10 | 10 | 10 |
| Polymerization Temperature, ° C | 120 | 120 | 120 | 120 |
| Total Solids, Percent | 27.5 | 28.0 | 27.9 | 41.0 |
| Properties: |  |  |  |  |
| Melt Flow [2] | 2.0 | 3.3 | 5.1 | 1.60 |
| Izod Impact [3] | 2.2 | 2.6 | 2.0 | 0.54 |

[1] Linear polybutadiene having 35% cis-1,4 content (Mooney viscosity = 55).
[2] ASTM D-1238-57T, 190° C., grams/10 minutes (5,000 grams load).
[3] ASTM D-256-56, injection molded.
[4] SBR Rubber.
[5] Added at 23.5% total solids.

The data in Table III further illustrate the beneficial results attained by utilizing the incremental mercaptan additions and the particular linear polybutadiene rubbers of this invention. Not only were improvements in the melt flow values realized, but the impact strengths were maintained above commercially acceptable values.

It has been further demonstrated in the above Table III that the use of rubber components other than the linear polybutadiene in conjunction with incremental mercaptan addition, did not give the desired results. Thus, in Run D, the use of SBR in place of the linear polybutadiene resulted in a polymeric product having inferior impact properties.

While particular embodiments of this invention are illustrated above, it will be understood that the invention is obviously subject to variations and modifications without departing from its broader aspects.

What is claimed is:

1. In a polymerization process for preparing a rubber-modified polymer which comprises the steps of prepolymerizing a feed mixture comprising styrene, a linear polybutadiene having a cis-1,4 content of at least 30%, and about 0.01 to 0.5% weight of a chain regulating alkyl mercaptan having from about 6 to 24 carbon atoms per molecule with agitation to obtain a conversion of about 10 to 45% polymeric material, suspending the resulting reaction product mixture in an aqueous suspension containing therein hydroxyethyl cellulose as the suspending agent and a peroxide initiator and polymerizing the resulting suspension to obtain substantially complete conversion of monomers to polymeric material, the improvement which consists essentially of adding additional alkyl mercaptan in at least one separate increment during said polymerization process and recovering from the suspension polymerization step a rubber-modified polymer having an appreciably higher Izod impact strength and hardness than polymers prepared using a single mercaptan addition and having the same melt index.

2. The process of claim 1 wherein said feed mixture also contains a monomer selected from the group consisting of acrylonitrile, methyl methacrylate, alpha-methylstyrene and mixtures thereof.

3. The process of claim 1 wherein said alkyl mercaptan is tertiary dodecyl mercaptan.

4. The process of claim 1 wherein the total amount of said mercaptan is within the range of about 0.01 to 0.3%, based on the total weight of said feed mixture.

5. The process of claim 1 wherein an incremental portion of said mercaptan is added to said feed mixture prior to the prepolymerization step and at least one other portion is added during said prepolymerization step and prior to said suspension polymerization step.

6. The process of claim 1 wherein an incremental portion of said mercaptan is added during the prepolymerization step and a separate portion is added during said suspension polymerization step.

7. The process of claim 1 wherein said feed mixture contains a minor amount of an inert alkyl aromatic hydrocarbon.

8. The process of claim 7 wherein said alkyl aromatic hydrocarbon is ethylbenzene.

References Cited

UNITED STATES PATENTS 2,820,773  1/1958  Childers et al. _____ 260—880
3,243,481  3/1966  Ruffing et al. _____ 260—880

FOREIGN PATENTS 854,238  11/1960  Great Britain.

GEORGE F. LESMES, *Primary Examiner.*

U.S. Cl. X.R.

260—33.6, 28.5, 31.2